United States Patent [19]
Kojima et al.

[11] Patent Number: 5,059,461
[45] Date of Patent: Oct. 22, 1991

[54] OPTICAL DISK SUBSTRATE, OPTICAL INFORMATION-STORAGE MEDIUM, AND PROCESS AND APPARATUS FOR MANUFACTURING THE OPTICAL DISK SUBSTRATE

[75] Inventors: Kotaro Kojima; Yasumasa Shibata; Toshiki Shojima, all of Chiba, Japan

[73] Assignee: Idemitsu Petrochemical Co., Ltd., Tokyo, Japan

[21] Appl. No.: 466,635

[22] Filed: Jan. 17, 1990

[30] Foreign Application Priority Data

Jan. 20, 1989 [JP] Japan .................................... 1-9993
Jan. 20, 1989 [JP] Japan .................................... 1-9994

[51] Int. Cl.$^5$ .............................................. B32B 3/02
[52] U.S. Cl. ........................................ 428/64; 428/65; 428/412; 428/913; 369/272; 369/284; 341/76 L; 341/135.1; 430/945

[58] Field of Search .................. 428/64, 65, 412, 913; 369/272, 284; 346/76 L, 135.1; 430/945

[56] References Cited

U.S. PATENT DOCUMENTS 4,701,770 10/1987 Ito et al. .......................... 346/135.1
4,764,331 8/1988 Tokuhara et al. .................. 264/106
4,798,767 1/1989 Aoki et al. ........................... 428/463

FOREIGN PATENT DOCUMENTS 0379130 7/1990 European Pat. Off. .

Primary Examiner—Patrick J. Ryan
Attorney, Agent, or Firm—Antonelli, Terry, Stout & Kraus

[57] ABSTRACT

An optical disk substrate having a foreign-substances index of not more than $1 \times 10^5$ $\mu m^2/g$, an optical information-storage medium wherein the substrate has an information-recording layer, and a propocess and an apparatus for manufacturing the optical disk substrate.

6 Claims, No Drawings

OPTICAL DISK SUBSTRATE, OPTICAL INFORMATION-STORAGE MEDIUM, AND PROCESS AND APPARATUS FOR MANUFACTURING THE OPTICAL DISK SUBSTRATE

BACKGROUND OF THE INVENTION

1. Field of the Invention

The present invention relates to an optical disk having a reduced amount of foreign substance, an optical information-storage medium, and an injection molding process and apparatus suitable for manufacturing the optical disk substrate.

2. Description of the Related Art

An optical information-storage medium, such as an audio-disk, a laser disk, an optical disk memory, and a magneto-optical disk, records and/or reads out information by utilizing laser beams. In the optical storage medium, a transparent substrate, i.e., an optical disk substrate, prepared from polycarbonate, polymethyl methacryrate, glass or the like, is used, and foreign substances, such as dust or carbonized material, contained in the optical disk substrate have a considerable affect on the reliability of a recording and/or a reading out of information.

In consideration of the above circumstances, the foreign substances contained in a raw material were filtered off, during a purification or granulation step, to reduce the amount thereof. For example, Japanese Unexamined Pat. Publication (KOKAI) No. 61-90345 and No. 63-91231 disclose such a filtration method.

The above Japanese Unexamined Pat. Publication (KOKAI) No. 61-90345 discloses that an amount of the foreign substances having a particle diameter of 0.5 $\mu$m or more should be $1 \times 10^5$/g or less in the optical disk substrate, and to comply with the above requirement, the foreign substances contained in the raw material such as a monomer should be removed by distillation and/or filtration, the manufacturing apparatus must be kept clean, and further, an inclusion of the foreign substances during a manufacturing step should be prevented.

The above Japanese Unexamined Pat. Publication (KOKAI) No. 63-91231 discloses that an amount of foreign substances having a particle diameter of 1 $\mu$m or more should be 10000/g or less in the storage medium, and to comply with the above requirement, the foreign substances are removed by filtration of a solution in an organic solvent, and further, the storage medium is formed from a resin composition which has been passed through a sintered metallic filter, in a molten state, to remove the fine foreign substances.

Although the above patent publications mention that the number of foreign substances having a particle diameter of at least 0.5 $\mu$m or 1 $\mu$m per 1 g of the raw material affects the recording and/or reading-out characteristics, for example, an error ratio (i.e., bit error ratio: BER), this number is not always an appropriate indicator for an evaluation thereof.

The amount of foreign substances cannot be sufficiently reduced only by removing the foreign substances from the unmelted resin, and thus an inclusion of dust should be prevented during a pelletizing step, or a production or inclusion of carbonized material should be avoided during an extruding step. Reference is made to Japanese Unexamined Pat. Publications (KOKAI) No. 58-126119 and No. 61-95914.

The above Japanese Unexamined Pat. Publication (KOKAI) No. 58-126119 discloses that the optical disk substrate is molded from a pellet prepared by incorporating an antioxidizing agent into a polycarbonate flake, and pelletizing the mixture, but, the process disclosed in the publication has disadvantages such that the melting by heating during the pelletizing step causes a thermal deterioration of the material, and the inclusion of foreign substances cannot be sufficiently avoided during the pelletizing step.

The above Japanese Unexamined Pat. Publication (KOKAI) No. 61-95914 discloses that the optical disk substrate is manufactured by carrying out a suspension polymerization of methyl methacrylate (MMA), to produce a transparent acrylic resin beads, and then carrying out an injection molding of the beads without pelletizing. The process disclosed in the Publication, however, is applicable only to an acrylic resin having a low heat resistance, moisture resistance, and strength, and is not applicable to a polycarbonate having excellent properties as the material for an optical disk, because, in the case of the polycarbonate, the polymer beads cannot be produced due to a difference in the polymerization step.

SUMMARY OF THE INVENTION

The inventors of the present invention found that the optical disk substrate can be evaluated quantitatively and practically by employing a new concept of a foreign-substances index.

Accordingly, the object of the present invention is to provide an optical disk substrate, wherein a lowering of the recording and/or reading out characteristics caused by an inclusion of foreign substances is prevented by bringing the foreign-substances index below a certain level.

Another object of the present invention is to provide an information-storage medium, and maintaining a high quality and a high reliability thereof.

Other objects and advantages of the present invention will be apparent from the following description.

In accordance with the present invention, there is provided an optical disk substrate having a foreign-substances index of not more than $1 \times 10^5$ $\mu$m$^2$/g.

DESCRIPTION OF THE PREFERRED EMBODIMENTS

The inventors employed a concept of a foreign-substances substances index to evaluate an amount of foreign substances contained in the optical disk substrate. After examining a relationship between the foreign-substances index and the recording and/or reading-out characteristics, the inventors found that a correlation existed between the foreign-substances index and an error ratio of the recording and/or reading out characteristics. Namely, the inventors found that, as a criterion for evaluating the properties of the information-storage medium, the use of only a number of foreign substances is not accurate, but a foreign-substances index produced after due consideration of the number and a particle size distribution thereof is optimal.

The term "foreign-substances index" used herein means a sum of a product of (i) a square of a particle diameter and (ii) the number, of each foreign substance (having a particle diameter of 0.5 $\mu$m or more) per unit weight. The foreign-substances are detected in a solution prepared by dissolving in an excess amount of an organic solvent (particularly, methylene chloride) a material (e.g., a raw material or a substrate) to be evaluated. The index is calculated from the equation, $$I = \Sigma\{[\tfrac{1}{2}(d_i + d_{i+1})]hu\, 2 \times (nu - ni')\}/W,$$

wherein I denotes the foreign-substance index, di denotes an i-th numerical valuem (μm) for dividing a range of the particle diameter, and ni denotes the number of foreign substances having a particle diameter of less than di+1 and not less than di, and detected in the solvent, ni' denotes the number of foreign substances involved in the solvent before use, and w denotes the weight (g) of a material. An example of the numerical values for dividing the range of the particle diameter is as follows:

| | |
|---|---|
| $d_1 = 0.5\ \mu m$ | $d_2 = 0.6\ \mu m$ |
| $d_3 = 0.7\ \mu m$ | $d_4 = 1.1\ \mu m$ |
| $d_5 = 2.5\ \mu m$ | $d_6 = 5.0\ \mu m$ |
| $d_7 = 10.0\ \mu m$ | $d_8 = 20.0\ \mu m$ |
| $d_9 = 25.0\ \mu m.$ | |

If foreign substances having a diameter of more than 25.0 μm are detected, d10, d11, and so on having an appropriate numerical value are used.

The term "foreign substances" used herein means essentially contaminants, such as impurities, dust or carbonized material of a raw resin, which have been included in the optical disk substrate at various stages. Nevertheless, the bit error ratio of the optical disk substrate can be accurately evaluated by using the foreign-substances index calculated from the "foreign substances" which are an insoluble residue in methylene chloride.

According to the present invention, the foreign-substances index of the optical disk substrate must be 1 $\times 10^5\ \mu m^2 g$ or less, to ensure a sufficient reliability as an optical substrate of an information-storage medium. If the foreign-substances index of the optical disk substrate is higher than 1 $\times 10^5\ \mu m2/g$, the foreign substances undoubtedly cause bit errors in the information-storage medium containing such a substrate, and the reliability of the optical disk substrate will be lowered.

The foreign-substances index is preferably 5 $\times 10^4\ \mu m2/g$ or less, to ensure greater reliability, more preferably 3 $\times 10^4\ \mu m2/g$ or less, to obtain an absolute reliability.

Any resin having good optical properties (such as transparency) or moldability, may be used as a raw material for the optical disk substrate. For example, polycarbonate, acrylic, non.crystallizable polyolefin resin or the like may be used. Preferably, polycarbonate is used, because of a heat resistance, a mechanical strength, and a cost of the material.

The polycarbonate resin which may be used is not limited; for example, a polycarbonate resin having a viscosity-average molecular weight of 10000 to 22000, preferably 12000 to 20000, and prepared by reacting a dihydric phenol and a carbonate, such as phosgene or diphenyl carbonate, may be used. As dihydric phenol, there may be mentioned hydroquinone, 4,4'-dioxyphenyl, bis(hydroxyphenyl)alkane, bis(hydroxyphenyl)ether, bis(hydroxyphenyl)ketone, bis(hydroxyphenyl)sulfide, or bis(hydroxyphenyl)sulfone, and the lower-alkyl or halogen. substituted derivatives thereof. Preferably, 2,2'-bis(4-hydroxyphenyl)propane (hereinafter referred to as bisphenol A), 1,1-bis(4-hydroxyphenyl)ethane, 2,2-bis(4-hydroxyphenyl)-hexafluoropropane or the like is used. The above dihydric phenol may be used alone, or in a combination thereof.

A polycarbonate partially having branched chains may be used in the present invention.

The viscosity-average molecular weight of 10000 to 22000 can be controlled by adding an end-capping agent, such as p-t-butylphenol, during a step of manufacturing the polycarbonate. If the viscosity-average molecular weight is less than 10000, the strength of the optical disk substrate becomes too low to withstand practical use, and if the viscosity-average molecular weight is higher than 22000, an optical disk substrate having a good moldability and optical properties cannot be obtained.

The viscosity-average molecular weight [Mv] can be calculated by determining a specific viscosity [ηsp] of a solution of polycarbonate in methylene chloride at 20° C., and using the following equations, $$\eta sp/C = [\eta](1 + 0.28\eta sp)$$

wherein C denotes a concentration (g/1) of polycarbonate resin, and $$[\eta] = 1.23 \times 10^{-5} Mv^{0.83}.$$

After the polycarbonate is prepared in accordance with a conventional known process, preferably the solution thereof is filtered, or the granulates thereof are washed with a poor solvent, such as acetone, while heated, to remove impurities or foreign substances such as low-molecular weight compounds, unreacted compounds, and so on. The amount of the foreign substances, impurities, solvents and so on contained in the raw material for injection molding should be as low as possible.

If necessary, the raw material may contain additives, such as antioxidizing agent, e.g., phosphorus derivatives.

As a resin other than the polycarbonate resin, there may be used acrylic resin, such as polymethyl methacrylate, or a copolymer of methyl methacrylate and another methacrylate, acrylate or styrene monomer, or a non-crystallizable polyolefin, such as a random copolymer of ethylene and a cyclo-olefin.

As mentioned above, the bit error ratio (BER) of the recording/reading-out characteristics of the optical disk can be quantitatively determined from the magnitude of the foreign-substances index in the disk substrate, because the bit error ratio and the foreign-substances index are correlated.

The information-storage medium according to the present invention can be produced by forming a conventional known information-recording layer on the above optical disk substrate.

The information-recording layer may be formed in a thickness of, generally 300 to 1000Å, by a sputtering, deposition or the like of a combination of a transition metal, such as Fe or Co, and a rare earth element, such as Tb or Gd, for example, Gd-Fe-Co or Tb-Fe-Co material. Further, a magneto-optical disk may be produced by forming a protective layer having a thickness of 2 to 10 μm, from an ultraviolet-curing resin.

Apart from the above photomagnetic type, any organic recording layer, such as phthalocyanine or tetracarbonyl cyanine, may be used as the information-recording layer, as long as the organic layer can be recorded with a laser beam or the like.

According to the present invention, there is also provided an injection molding apparatus suitable for manufacturing the present optical disk substrate. The injection molding apparatus according to the present invention has a structure wherein a cylinder and a screw of a conventional injection molding apparatus are replaced by a cylinder having an inner wall lined with a Co-Ni-Mo-Cr alloy (e.g., an alloy comprising 5 to 80 % of Co, 5 to 80 % of Ni, 0.1 to 10 % of Mo, and 1 to 20 % of Cr), and a screw having a surface thereof coated with a TiC layer and a TiN layer, respectively.

The lining layer on the inner wall of the cylinder is generally formed by means of centrifugal casting or hot isostatic pressing to a thickness of 0.5 to 5 mm. The two-layer coating is generally carried out by forming the TiN layer (to a thickness of 1 to 20 $\mu$m) on the TiC layer (to a thickness of 1 to 20 $\mu$m), by means of chemical vapor deposition or physical vapor deposition method.

When an injection molding is carried out with a conventional injection-molding apparatus, usually, some resin passing through the apparatus remains therein, or is unevenly heated. Accordingly, the melted resin is partially carbonized, to form a carbonized material, which in turn is included in the resin as a foreign substance. Further, a foreign substance which has been bonded to various members of the injection-molding apparatus but has not been removed during a cleaning step, is incorporated into the resin. Under these circumstances, when the conventional apparatus is used, the foreign-substances index of the resin is increased by $1 \times 10^4$ to $5 \times 10^5$ $\mu$m2/g, a step of charging the raw material into a hopper to a final step of obtaining the molded optical disk substrate. In particular, the partial carbonization of the resin considerably affects the increase of the foreign-substances index.

In the injection-molding apparatus according to the present invention, the inner wall of the cylinder has a lining of the Co-Mo-Mo-Cr alloy, and because this alloy lining has a good corrosion resistance and non-adhesiveness, the bonding or remaining of the resin is reduced, whereby the above-mentioned partial carbonization or deterioration is avoided.

Further, the surface of the screw in the apparatus of the present invention has a two-layer coating, i.e., the TiC layer and the TiN layer, and due to the non-adhesiveness of the resin to the surface of the screw, the burning of remaining resin is prevented and the production of carbonized material inhibited. Further, because the two-layer coating has not only the TiC layer but also the TiN layer, as the surface layer, the oxidation resistance at an elevated temperature is enhanced, and thus, the production of carbonized material is even more effectively prevented.

When polycarbonate is used as the raw resin for the optical disk substrate according to the present invention, the resin having a foreign.substances index of, usually 30000 $\mu$m2/g or less, preferably 15000 $\mu$m2/g or less, is used. During the injection molding, the temperature of the resin is 300 to 400° C., and the temperature of the mold is usually 50 to 140° C.

It is to be noted that only a surface temperature of the mold is made higher than a glass transition temperature of the resin, using a high frequency or the like, and after injecting the resin, the resin may be cooled to a temperature at which the disk substrate can be taken out. This process results in a substrate having improved optical properties.

The injection-molding apparatus according to the present invention can be used to produce a molded article having a low concentration of foreign substances contained therein.

According to a process of the present invention for manufacturing the optical disk substrate, a disk substrate having a foreign-substances index of not more than $1 \times 10^5$ $\mu$m2/g can be produced by carrying out an injection-molding of an unmelted polycarbonate powder having a viscosity-average molecular weight of 10,000 to 22,000. Preferably, powders having a particle diameter of 500 to 2000 $\mu$m account for at least 95% by weight of the total polycarbonate powder. Further, the polycarbonate powder preferably has a bulk density of 0.6 to 0.8 g/cm3.

When the disk substrate is produced by directly carrying out an injection-molding of unmelted polycarbonate powder, the foreign-substances index of the raw material can be lowered, and further, a heat history of the resin may be limited to only one operation, whereby pyrolysis of the resin is reduced and the inclusion of carbonized material minimized, and therefore, a high-performance optical disk substrate having a low foreign-substances index and exhibiting a low bit error ratio is easily obtained.

A preferred embodiment of a process for manufacturing the optical disk substrate according to the present invention will be described hereinafter.

Polycarbonate resin is used as the raw material for the disk substrate. This polycarbonate resin has a viscosity.average molecular weight of 10000 to 22000, preferably 12000 to 20000, and is an unmelted powder, not a melted pellet as generally used.

The viscosity-average molecular weight should be 10000 to 22000, to ensure a good moldability by which enhanced and uniform optical properties, such as transparency or birefringence, or a higher strength of the optical disk substrate, are obtained.

The polycarbonate resin which may be used is not limited, and any of the above-mentioned resins may be used.

As mentioned above, after the polycarbonate is prepared in accordance with a conventional known process, preferably the solution thereof is filtered, or the granulates thereof are washed with a poor solvent, such as acetone, while heated, to remove impurities or foreign substances, such as, low-molecular weight compounds, unreacted compounds and so on. The amounts of foreign substances, impurities, solvents and so on contained in the raw material for injection molding should be as low as possible.

If necessary, the raw material may contain additives, such as an antioxidizing agent, e.g., phosphorus derivatives.

With respect to a particle size distribution, preferably powders having a particle diameter of 500 to 2000 $\mu$m account for at least 95% by weight of the whole polycarbonate powder. A polycarbonate having a viscosity-average molecular weight is generally in the form of finely divided powders, and therefore, a deaeration or uniform conveying thereof is difficult or impossible during a melting step. Therefore, the above particle size distribution is preferable, to ensure a stable injection molding and obtain a good disk substrate.

More preferably, powders having a particle diameter of 700 to 1400 $\mu$m account for at least 95% by weight of the whole polycarbonate powder. In this case, the powder used has the narrow particle size distribution, and thus, a screw plastication as a melted pellet during the injection molding can be stably carried out.

To ensure a good fusibility, deaeration, and measurability or the like, preferably the polycarbonate powder has a bulk density of 0.6 to 0.8 g/cm$^3$.

When the optical disk substrate is manufactured from the above polycarbonate resin, an injection-molding apparatus, including an injection compression molding apparatus, is used. A conventional injection molding apparatus may be used. To reduce the production of carbonized material and improve the reliability of the disk substrate, however, the above-mentioned apparatus comprising the cylinder having an inner wall lined with the Co-Ni-Mo-Cr alloy, and the screw having a surface coated with the TiC layer and the TiN layer, is preferably used.

Because the Co-Ni-Mo-Cr alloy lining on the inner wall of the cylinder and the two-layer coating of the TiC layer and the TiN layer on the screw surface provide the surfaces thereof with a good corrosion resistance, and a non-adhesiveness of the resin to the surfaces thereof, the production of carbonized material at an elevated temperature (400° C.) can be inhibited.

During the injection molding, the temperature of the resin is 300 to 400° C., and the temperature of the mold is preferably 80 to 130° C.

Only a surface temperature of the mold may be higher than a glass transition temperature of the resin, using a high frequency or the like, and after injecting the resin, the resin may be cooled to a temperature at which the disk substrate can be taken out. This process results in a substrate having improved optical properties.

According to the present process, an optical disk substrate having a diameter of 40 to 170 mm and a thickness of 1 to 3 mm, is manufactured. The foreign-substances index of the optical disk substrate produced by the above process is preferably $1 \times 10^5$ $\mu m^2/g$ or less, more preferably $5 \times 10^4$ $\mu m^2/g$ or less, to ensure a reduction of the bit error ratio and a better reliability.

To lower the foreign-substances index, preferably an injection-molding apparatus is used wherein the inner surface of the cylinder and the surface of the screw are treated as mentioned above, and/or a polycarbonate powder including 5% by weight or less of low-molecular weight compounds (having a molecular weight of 3000 or less), 20 ppm or less of impurities, such as unreacted bisphenol A, 20 ppm or less of solvents, such as methylene chloride, or the like, and prepared by sufficiently repeating washing with water, acidic or alkaline solution, or a poor solvent, such as acetone (while heated, if necessary), is employed during the step of manufacturing the polycarbonate powder.

EXAMPLES

The present invention now will be further illustrated by, but is no means limited to, the following Examples.

EXAMPLE 1

The injection-molding apparatus used in this example was prepared from the conventional apparatus (Technoplas Co., Ltd.: SIM.4749) by lining the inner wall of the cylinder with a Co-Ni-Mo-Cr alloy (Nippon Koshuha Co., Ltd.: K-alloy), and applying a two-layer coating of a TiC layer (4 $\mu$m) and a TiN layer (4 $\mu$m) on the surface of the screw. As the molding material, a polycarbonate pellet (diameter 3 mm and thickness 3 mm) having a viscosity-average molecular weight of 15000 was used. The foreign-substances index of the polycarbonate was 8000 $\mu m^2/g$. An optical disk substrate (diameter 130 mm and thickness 1.2 mm) was prepared by molding the material at a resin temperature of 360° C. and a mold temperature of 120° C.

A Tb-Fe-Co recording layer was formed on the resulting disk substrate by spattering, to obtain an information-storage medium. The bit error ratio of the medium was measured by OMS-1000 (Nakamichi Co., Ltd.).

The foreign-substances index of the disk substrate and the bit error ratio of the medium are shown in Table 1.

EXAMPLE 2 and 3

The procedure described in Example 1 was repeated, except that a polycarbonate pellet having a foreign-substances index of 3500 $\mu m^2/g$ (Example 2) or 2500 $\mu m^2/g$ (Example 3) was used. The resulting substrate and medium were evaluated as above, and the results are shown in Table 1.

COMPARATIVE EXAMPLE

The procedure described in Example 1 was repeated, except that the screw surface was coated with Ni-SiC, and the inner wall of the cylinder was subjected to a nitriding treatment. The resulting substrate and medium were evaluated as above, and the results are shown in Table 1.

TABLE 1

|  | Foreign-substances index ($\mu m^2/g$) | Bit error ratio (Bit/Bit) |
| --- | --- | --- |
| Example 1 | $1.5 \times 10^4$ | $1.8 \times 10^{-6}$ |
| Example 2 | $9.5 \times 10^3$ | $0.7 \times 10^{-6}$ |
| Example 3 | $4.8 \times 10^4$ | $2.0 \times 10^{-5}$ |
| Comparative Example | $1.9 \times 10^5$ | $1.5 \times 10^{-4}$ |

It is apparent from the Table 1 that the optical disk substrates prepared by the apparatus of the present invention have lower foreign-substances indexes, and the storage mediums obtained therefrom have lower bit error ratios, in comparison with those prepared in the Comparative Example.

EXAMPLES 4 TO 6

As a molding material, an unmelted polycarbonate (viscosity.average molecular weight 15600: powders having a diameter of 700 to 1400 $\mu$m accounting for 96.5% by weight of the whole powder: bulk density 0.68 g/cm$^3$) as shown in Table 2 was used, respectively. An optical disk substrate (diameter 130 mm and thickness 1.2 mm) was molded at a molding temperature of 360° C. and a mold temperature of 120° C., using an injection-molding apparatus treated as indicated in Table 2.

As in Example 1, a Tb-Fe-Co recording layer was formed on the resulting disk substrate by spattering, to obtain an information-storage medium. The bit error ratio of the medium was measured as in Example 1.

The foreign-substances index of the disk substrate and the bit error ratio of the medium are shown in Table 2.

EXAMPLE 7

The procedure described in Example 4 was repeated, except that a melted polycarbonate pellet (viscosity-average molecular weight 15400, diameter 3 mm, and thickness 3 mm) was used instead of unmelted polycarbonate. The results are shown in Table 2.

TABLE 2

|  | Examples | | | |
| --- | --- | --- | --- | --- |
|  | 4 | 5 | 6 | 7 |
| Raw material | unmelted PC* | unmelted PC* | unmelted PC* | pellet PC* |
| FSI** of raw material | 4800 | 1500 | 4800 | 15000 |
| Cylinder of molding machine | Co—Ni—Mo—Cr coating | Co—Ni—Mo—Cr coating | nitride | Co—Ni—Mo—Cr coating |
| screw of molding machine | TiC/TiN coating | TiC/TiN coating | Ni—SiC plating | TiC/TiN coating |
| FSI** of substrate | $8.5 \times 10^3$ | $5 \times 10^3$ | $2.5 \times 10^4$ | $3.3 \times 10^4$ |
| BER*** (Bit/Bit) | $1.1 \times 10^{-6}$ | $5 \times 10^{-7}$ | $4.5 \times 10^{-6}$ | $1.3 \times 10^{-5}$ |

PC* ... polycarbonate; FSI ... foreign-substances index; BER* ... bit error ratio.

It is apparent from the Table 2 that the optical disk substrates prepared by using an unmelted polycarbonate have improved foreign-substances indexes, and the storage mediums obtained therefrom have improved bit error ratios, and the unmelted polycarbonate provides a high performance disk substrate.

Although the present invention has been described with reference to specific embodiments, various changes and modifications obvious to those skilled in the art are deemed to be within the spirit, scope and concept of the invention.

We claim:

1. An optical disk substrate having a foreign-substances index of not more than $1 \times 10^5$ $\mu m^2/g$; said optical disk substrate being prepared from polycarbonate having a viscosity average molecular weight of 10,000 to 22,000.

2. An optical information-storage medium, comprising an optical disk substrate having a foreign-substances index of not more than $1 \times 10^5$ $\mu m^2/g$ and a layer formed thereon for recording information; said optical disk substrate being prepared from polycarbonate having a viscosity average molecular weight of 10,000 to 22,000.

3. An optical disk substrate according to claim 1, wherein said foreign-substances index is determined by the number of the particles of the foreign substances and particle diameter distribution of the foreign substances detected in the optical disk substrate.

4. An optical information-storage medium according to claim 2, wherein said foreign-substances index is determined by the number of particles of the foreign substances and particle diameter distribution of the foreign substances detected in the optical disk substrate.

5. An optical disk substrate prepared from polycarbonate, said polycarbonate having a viscosity average molecular weight of 10,000 to 22,000, and having a foreign-substances index of not more than $1 \times 10^5$ $\mu m^2/g$, which is calculated from the equation:

$$I = \Sigma \tfrac{1}{2}) d_i + d_{i+1})^2 \times (n_i - n_i) \div W$$

wherein I denotes the foreign-substances index, di denotes an i-th numerical value ($\mu m$) for dividing a range of the particle diameter, the $n_i$ denotes the number of foreign substances having a particle diameter of less than $d_{i+1}$ and not less than $d_i$, and detected in a solvent, $n_i$ denotes the number of foreign substances involved in the solvent before use, and W denotes the weight (g) of the polycarbonate.

6. An optical information-storage medium, comprising an optical disk substrate prepared from polycarbonate, said polycarbonate having a viscosity average molecular weight of 10,000 to 22,000, and having a foreign-substances index of not more than $1 \times 10^5$ $\mu m^2/g$, which is calculated from the equation:

$$I = \Sigma \tfrac{1}{2} (d_i + d_{i+1}) hu\ 2 \times (n_i - n\ i')\} \div W$$

wherein I denotes the foreign-substances index, di denotes an i-th numerical value ($\mu m$) for dividing a range of the particle diameter, and $n_i$ denotes the number of foreign substances having a particle diameter of less than $d_{i+1}$ and not less than $d_i$, and detected in the solvent, $n_i$ denotes the number of foreign substances involved in the solvent before use, and W denotes the weight (g) of the polycarbonate.

* * * * *

UNITED STATES PATENT AND TRADEMARK OFFICE
CERTIFICATE OF CORRECTION

PATENT NO. : 5,059,461  
DATED : October 22, 1991  
INVENTOR(S) : K. KOJIMA, ET AL Page 1 of 2

It is certified that error appears in the above-indentified patent and that said Letters Patent is hereby corrected as shown below:

In column 3, line 5 of the text

" $I = \Sigma\{[\frac{1}{2}(di+di)]hu\ 2 \times (nu - ni')\}/W,$ "

should read $$--I = \Sigma \{ [\frac{1}{2}(d_{i+1} + d_i)] 2 \times (n_i - n_i') \} /W--$$

In claim 5, column 10, line 27

" $I = \Sigma \frac{1}{2})d_i + d_{i+1})^2 \times (n_i - n_i) \div W$ "

should read $$--I = \Sigma \{ [\frac{1}{2}(d_{i+1} + d_i)] 2 \times (n_i - n_i') \} /W--$$

UNITED STATES PATENT AND TRADEMARK OFFICE
CERTIFICATE OF CORRECTION

PATENT NO. : 5,059,461
DATED : October 22, 1991
INVENTOR(S) : K. KOJIMA ET AL

It is certified that error appears in the above-indentified patent and that said Letters Patent is hereby corrected as shown below:

In claim 6, column 10, line 44

$$\text{"} I = \Sigma\{(d_i + d_{i+1})\text{hu } 2 \times (n_i - n\, i')\} \div W \text{"}$$

should read $$--I = \Sigma \ \{ \ [\frac{1}{2}(d_{i+1} + d_i)] \ 2\times (n_i - n_i') \ \} \ /W \ --$$

Signed and Sealed this

First Day of March, 1994

Attest:

BRUCE LEHMAN

Attesting Officer

Commissioner of Patents and Trademarks